US005244123A

United States Patent [19]

Benedict

[11] Patent Number: 5,244,123

[45] Date of Patent: Sep. 14, 1993

[54] APPARATUS AND METHOD FOR APPLYING SEALING MATERIAL

[75] Inventor: James L. Benedict, Galion, Ohio

[73] Assignee: Flora M. Benedict, Galion, Ohio

[21] Appl. No.: 783,372

[22] Filed: Oct. 28, 1991

[51] Int. Cl.[5] .......... G01F 11/00

[52] U.S. Cl. .......... 222/260; 222/231; 222/261; 52/514; 52/744; 401/265

[58] Field of Search .......... 401/149, 146, 143, 265, 401/267, 172, 176, 179, 181, 182; 222/260, 256, 413, 231, 261, 333, 323, 324, 241, 335, 373, 400.7, 394, 326, 368, 367; 52/514, 744; 411/82, 29-31, 258

[56] References Cited

U.S. PATENT DOCUMENTS

| | | | |
|---|---|---|---|
| 1,783,092 | 11/1930 | Lewis | 222/231 |
| 2,610,768 | 9/1952 | Le Clair | 222/324 X |
| 2,694,509 | 11/1954 | Vita | 401/149 X |
| 2,908,425 | 10/1959 | Denson | 222/413 X |
| 3,186,602 | 6/1965 | Ricciardi | 222/241 X |
| 3,389,838 | 6/1968 | Morra et al. | 222/326 X |
| 3,411,213 | 11/1968 | Spinello | 222/413 X |
| 3,750,905 | 8/1973 | Wolfrom | 222/413 X |
| 3,985,273 | 10/1976 | Davis | 222/333 X |
| 4,322,022 | 3/1982 | Bergman | 222/333 X |
| 4,976,341 | 12/1990 | Lundell | 198/666 |

FOREIGN PATENT DOCUMENTS

| | | | |
|---|---|---|---|
| 1116686 | 5/1956 | France | 411/30 |

*Primary Examiner*—Danton D. DeMille
*Attorney, Agent, or Firm*—Calfee, Halter & Griswold

[57] ABSTRACT

An apparatus and method for applying mortar, grout, bonding materials and caulk ("sealing material") into or between building components or materials includes a handheld power tool having or adapted to mount, a hopper receiving a supply of sealing material, an auger associated with the hopper selectively to convey the sealing material, and a nozzle adjacent the end of the auger to direct the sealing material to the point of application. The auger may have temporary auger extension(s) releasably and rotatably coupled thereto for conveying sealing material into voids, cracks or holes ("holes") in the building components or materials, with the temporary auger extension(s) being uncoupled and left in the filled holes as a central anchor or reinforcing member. When used with caulk, the apparatus is preferably adapted to have a disposable caulk container coupled to the assembly to replace the hopper and a removable and disposable plastic auger assembly to replace the steel auger.

16 Claims, 7 Drawing Sheets

APPARATUS AND METHOD FOR APPLYING SEALING MATERIAL

FIELD OF THE INVENTION

This invention relates to an apparatus and method for applying sealing material into, onto or between building components or materials.

BACKGROUND OF THE INVENTION

The normal method for tuck pointing involves the manual application of sealing material to joints between building components. The sealing material is temporarily held by the applicator on a handheld board or the like and hand tools are used to apply the sealing material to the joint. This method normally achieves the application of less than 250 square feet of sealing material per day, even with an experienced applicator. At least one attempt has been made to improve upon this manual application method.

A hose has been used to transmit sealing material from a remote site to the point of application. However, the sealing material must be diluted with water to allow fluidic passage through the hose. The sealing material with the high water content is difficult to apply. The building materials tend to absorb the water resulting in the sealing material having the propensity to crack over time. In addition, separation of the sealing material and water may occur in passage through the hose resulting in potential blockage of the hose and in potential application of an improperly mixed sealing material.

SUMMARY OF THE INVENTION

The principal object of the present invention is to provide a method and apparatus for applying sealing material into, onto or between building components or material in a more efficient and expeditious manner. The apparatus and method utilizes a handheld power tool in combination with a hopper, feed auger and nozzle. One person can periodically supply sealing material to the hopper while another person continuously applies sealing material by using the apparatus of the present invention to obtain accurate and controlled auger feed. A removable scraper or a rotatable impeller can be used to assist in mixing and feeding the sealant material to the auger.

It is another object of the present invention to utilize at least one auger extension for specific restoration projects. The auger extension is temporarily coupled to the free end of the power tool auger. The auger extension can be relatively flexible, if needed, to enter into and conform with an irregularly formed hole in the building material or component being treated. The auger extension as received in the hole or void is used to positively force sealing material into the hole or void, with the auger extension being uncoupled when the hole or void is filled to form a central anchor or tendon.

It is still another object of the present invention to provide a method for structurally reinforcing and strengthening walls in need of stabilizing. In such method, holes are drilled into the wall in a predetermined configuration relative to one another. The hole configuration is based upon the structure and material involved, and the hole pattern is selected to provide the most reinforcement and strength under the circumstances. With the holes drilled, auger extensions are used to fill each of the holes and to form a central anchor or reinforcement therewithin when completed.

It is yet another object of the present invention to provide an apparatus that can be marketed either as a dedicated stand alone tool or as an after market option adapted to be added to existing power tools. In addition, the apparatus of the present invention may be adapted to the specific sealing material being applied and to plural forms of construction. For example, a pressurized air manifold can be used to fluidize the sealing material in the nozzle for spraying onto a building surface.

It is still a further object of the present invention to provide an apparatus that has components which can be readily disassembled for ease of cleaning and maintenance. If cost effective, some of these components can be made of relatively inexpensive materials to allow the components to be periodically discarded and replaced by new components.

The invention then comprises the features hereinafter fully described and particularly pointed out in the claims, the following description and annexed drawings setting forth in detail certain illustrative embodiments of the invention, these being indicative, however, of but a few of the various ways in which the principles of the invention may be embodied.

DESCRIPTION OF THE PREFERRED EMBODIMENT

Figure 2:
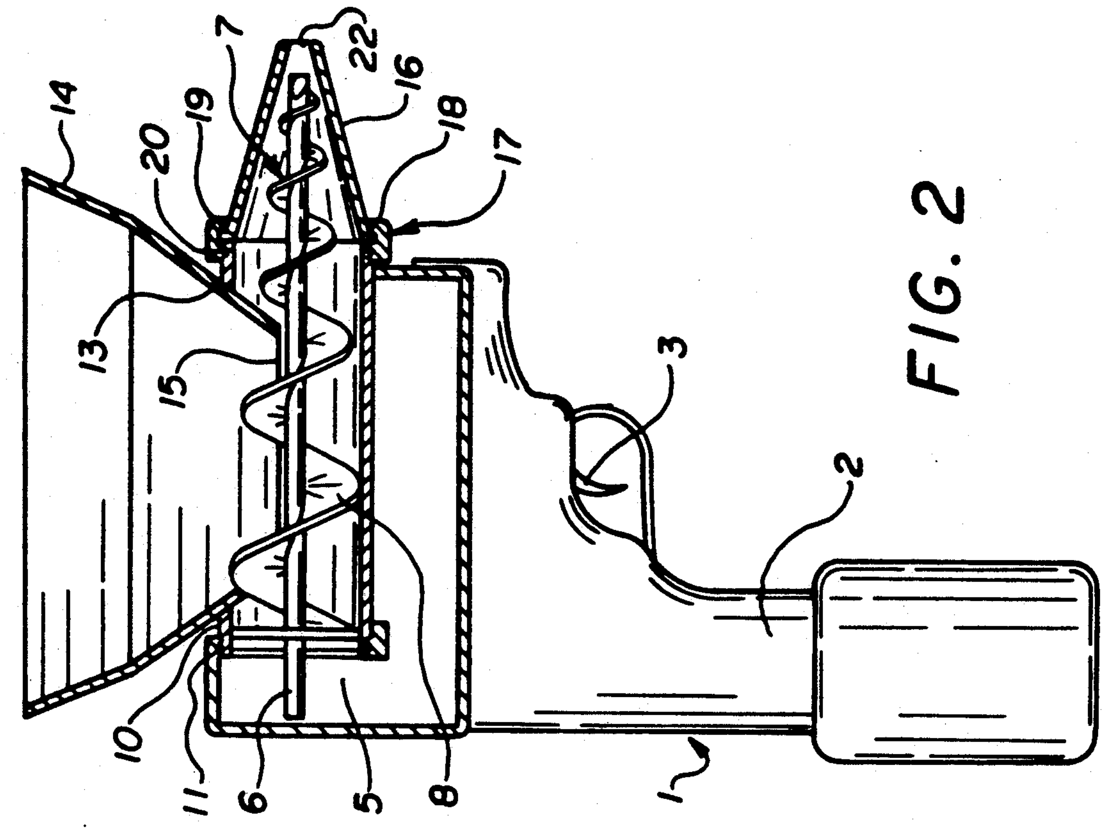
FIG. 2 is a side elevation similar to FIG. 1 showing the hopper, auger housing and nozzle in cross section for clarity for illustration.

Turning now in more detail to the drawings and initially to FIGS. 1 through 4, an applicator gun apparatus, indicated generally at 1, is adapted to apply mortar, grout or caulk into or between building components or materials. The term "sealing material" as used herein is meant to generically encompass mortar, grout, caulk, bonding materials and any other similar materials for similar applications.

The applicator gun 1 includes a pistol grip 2 and an actuating trigger 3. The body housing of the applicator gun contains a conventional power tool motor (not shown), which may be powered by a battery pack or by a conventional electrical power source. The motor drives a gear box 5 contained within the applicator gun housing.

Figure 1:
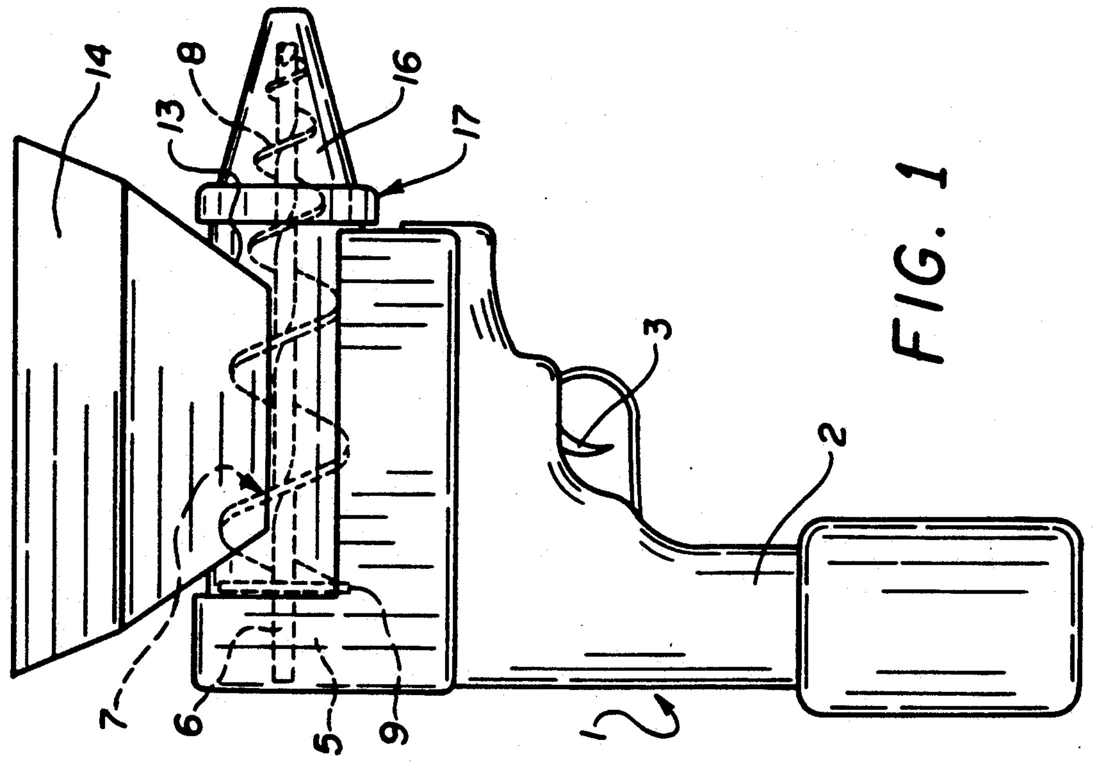
FIG. 1 is a side elevation of an applicator gun apparatus to apply sealing material into or between building components or materials, with the auger thereof being shown in hidden lines.
Figure 4:
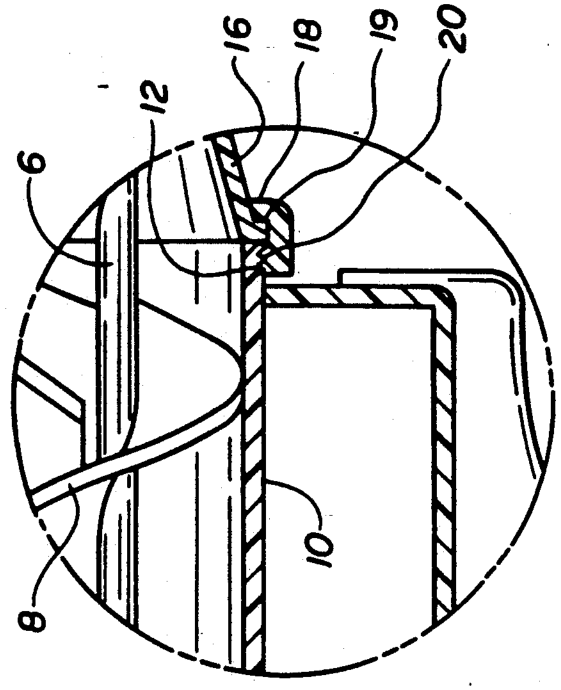
FIG. 4 is an enlarged cross-sectional detail of portions of the auger, auger housing, nozzle and retainer ring.

The shaft 6 of an auger, indicated generally at 7, is rotatably coupled at its back end to the output of gear box 5. The auger 7 includes a helical flight 8 secured to and extending substantially the entire length of auger shaft 6. The diameter of the helical flight may decrease from its back end to its front end as illustrated in FIG. 1. A sealing washer 9 may be integrally formed on the auger shaft 6 adjacent its rear end and behind auger flight 8. Alternatively, the washer 9 may have a central hole therein which tightly receives the rear end of auger shaft 6 allowing the washer to be replaced and/or repositioned on the auger shaft.

Figure 3:
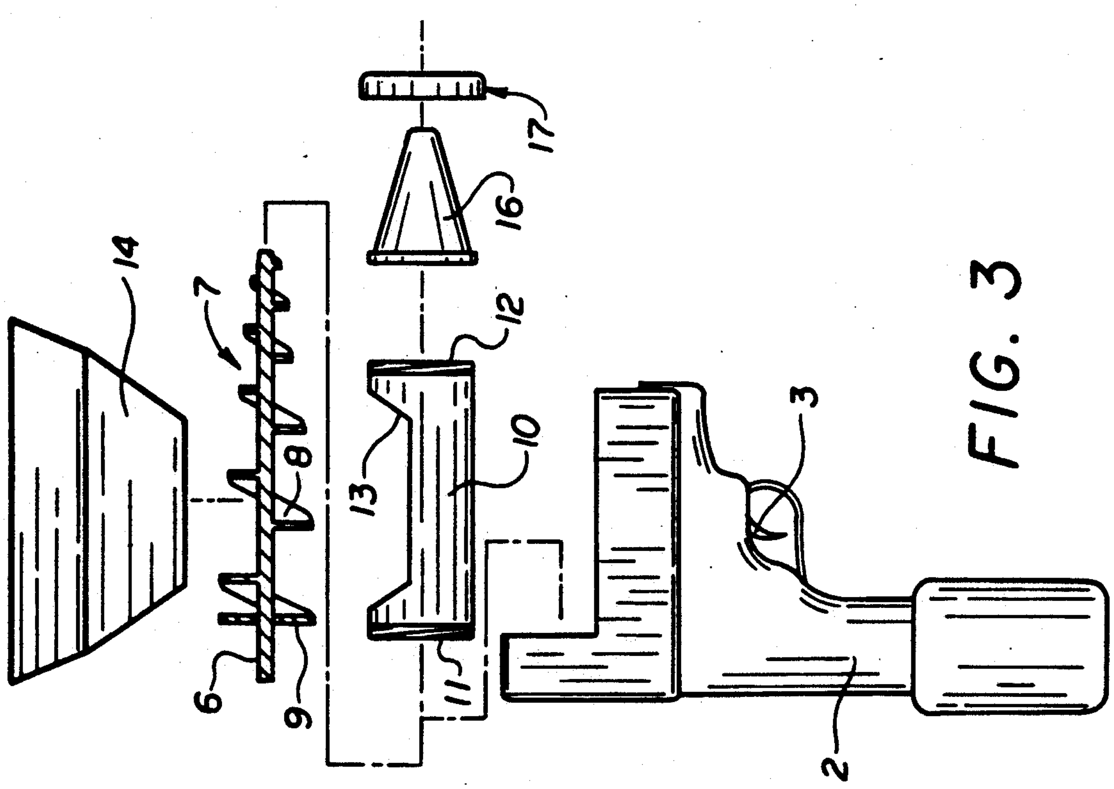
FIG. 3 is an exploded side elevation of the applicator gun of FIG. 1 illustrating the components thereof in unassembled form.

The main part of auger 7 is received within a generally tubular auger housing 10. As best illustrated in FIGS. 2 and 3, the generally tubular auger housing 10 has a threaded back end 11 and a threaded forward end 12. The top surface of generally tubular auger housing 10 has a hole 13 therein to receive the bottom portion of a hopper 14. Preferably, the hopper is removably mounted in the hole 13 of auger housing 10, although a permanent connection or integral unit can be made if desired.

In assembly, as best illustrated in FIG. 3, the auger 7 is inserted lengthwise into the generally tubular auger housing 10. The rear end 11 of auger housing 10 is then threadably connected to and supported by the housing of the applicator gun 1. At the completion of the threading, the opening 13 in auger housing 10 faces upwardly. The back end of the auger shaft 6 is received in and rotatably driven by the gear box 5 of the applicator gun 1. The washer 9 on auger shaft 6 seals the rear end of the auger housing 10 to preclude any sealing material from entering the gear box. The bottom portion of hopper 14 is then inserted into the opening 13 in auger housing 10. The hopper 14 has a bottom opening 15 to feed sealing material from the hopper into the auger housing 10.

The threaded front end 12 of the auger housing 10 has a nozzle 16 threadably secured thereto. For this purpose, a retainer ring 17 is received over the nozzle 16 and has a radially inwardly extending shoulder 18 thereon in endwise abutment with a radially outwardly extending flange 19 on the nozzle 16. The retainer ring 17 has an annular main body with internal threads 20 thereon which mate with the threaded end 12 of auger housing 10. As the retainer ring is threadably drawn down on end 12 of auger housing 10, the radial shoulder 18 engages flange 19 on nozzle 16 to secure the nozzle to the auger housing.

The nozzle 16 may be a truncated cone having an opening 22 at its forward end. The nozzle 16 can take many different structural forms having openings of different shapes and sizes as dictated by the specific application. The nozzle 16 encloses the forward end of auger 7.

In use, the hopper 14 is filled with sealing material to begin the application process. The operator then depresses trigger 3 to activate the motor and gear box 5. The auger 7 is rotatably driven to convey sealing material received through the open bottom end 15 of hopper 14 along the length of the auger, from left to right as viewed in FIG. 1. The sealing material is radially contained by the auger housing 10 and nozzle 16. The sealing material is conveyed at its forward end through the hole 22 in nozzle 16 to its point of application between, on or in building components or materials. The motor of the applicator gun may be provided with a conventional brake operative to positively stop auger rotation when the trigger 3 is released. The application of the sealing material is thus automatically and accurately controlled by the operator.

In use, the operator will preferably be assisted by one person who mixes the sealing material and periodically fills the hopper 14. The operator can thus be continuously using the gun 1 to apply sealing material to the joint or hole being treated. Applicant believes that this method can increase production allowing approximately 800–1200 square feet of sealing material to be applied per day.

By having the hopper, auger, auger housing and nozzle as separate components, clean up and maintenance of the applicator gun is facilitated. In this regard, the hopper can be removed from the auger housing, the nozzle can be removed from the auger housing, and the auger housing and auger can be removed from the applicator gun. Removability of these components also allows ready replacement of any defective component parts. To eliminate most of the cleaning function, some or all of the components can be made of relatively inexpensive materials, which allow these components to be periodically discarded. For example, the auger 7 may be made of plastic and most of the auger housing and nozzle may be made of cardboard or plastic. These removable and discardable components may be less expensive than the labor costs required for cleaning the components at the end of the day. In addition, more time will be used in productively applying sealing material to the joints or holes being treated.

Figures 5, 6:
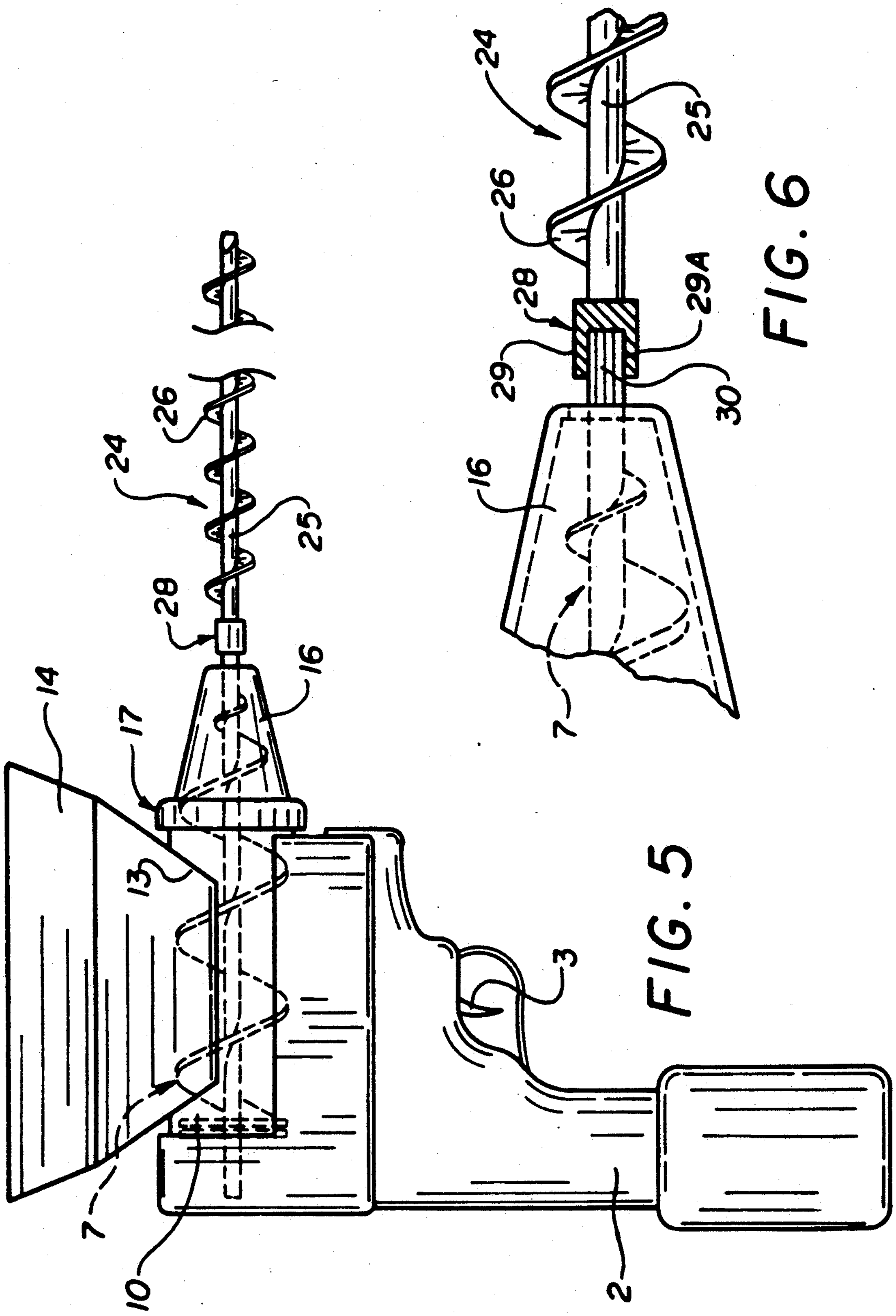
FIG. 5 is a side elevation of the applicator gun apparatus showing an auger extension temporarily coupled to the free end of the auger.
FIG. 6 is an enlarged detail showing the temporary coupling between the front end of the auger and the rear end of the auger extension.

Turning now to FIG. 5, it may be preferable in working with certain types of sealing materials to create as good a seal as possible between the hopper, auger and auger housing. Such a seal facilitates the gravity feed of sealing material from the hopper 14 through the bottom opening 15 therein to the auger housing 10. For this purpose, the outer diameter of auger flight 8 along its entire length may have a very tight clearance with the inner diameter of the auger housing 10. Similarly, the outer diameter of auger flight 8 may have a very tight clearance with the inner surface of the nozzle 16 to provide as good a seal as possible therebetween.

Turning now to FIGS. 5 and 6, an auger extension, indicated generally at 24, may be temporarily coupled to the forward free end of the applicator gun auger 7. The auger extension 24 includes a central shaft 25 and a helical flight mounted on and extending substantially the entire length of such shaft. The shaft 25 may be rigid or flexible, as required by the application. The shaft 25 and auger flight 26 for auger extension 24 may be made of any suitable material including, for example, steel or plastic.

The back end of the auger extension 24 includes a coupling, indicated generally at 28, to temporarily rotatably secure the auger extension 24 to the applicator gun auger. As illustrated, the coupling 28 includes a body 29 mounted on the rear end of auger shaft 25. Body 29 has a multi-faceted receptacle 29A therein. Receptacle 29A tightly receives a complementally configured, multi-faceted shank 30 on the front end of the auger shaft 6. The multi-faceted coupling receptacle receiving a complementally configured auger shank cooperatively provide a releasible rotatable drive connection therebetween. Other temporary rotatable drive connections between the main auger and auger extension can be used including, for example, a bayonet type drive.

Figure 9:
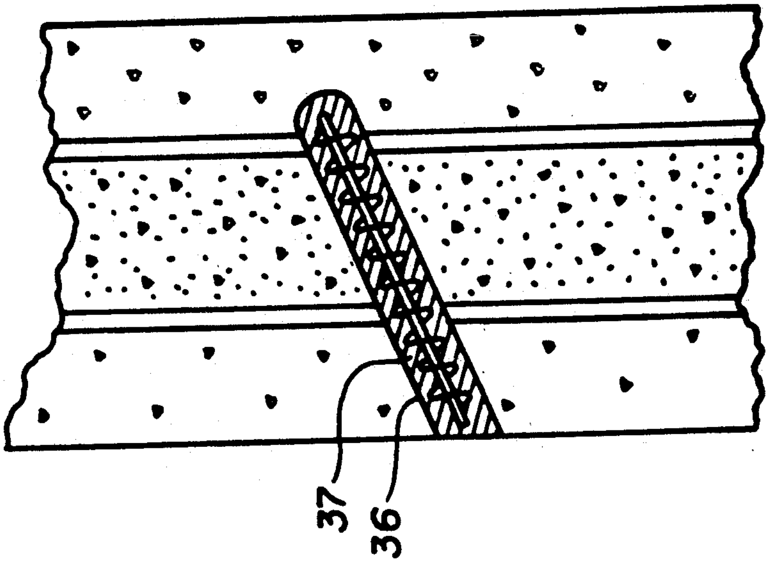
FIG. 9 is a side elevation showing a hole filled with sealing material having an auger extension centered therein as a reinforcement anchor.
Figure 7:
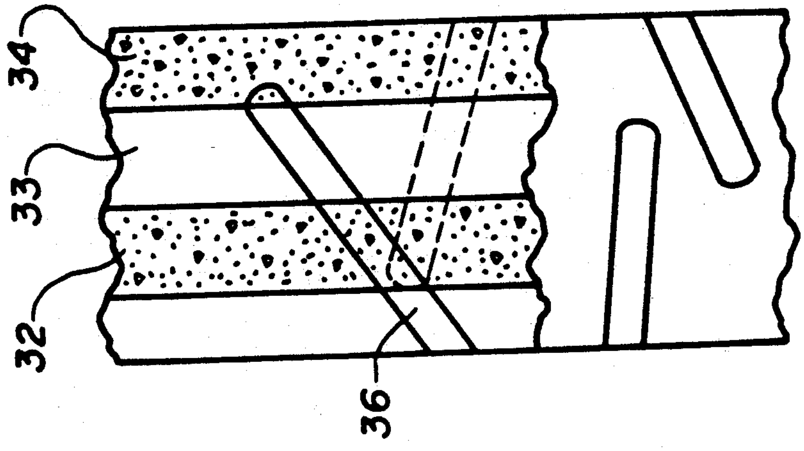
FIG. 7 is a side elevation showing holes adapted to be filled with sealing material to reinforce a wall having a plurality of vertical layers.

The auger extension is normally utilized when reinforcement is required for building components or materials. In many older buildings, walls have been constructed, as schematically illustrated in FIGS. 7 and 9, by multiple vertical layers 32, 33 and 34 being positioned in abutment with one another. These layers may not be physically joined or interconnected. To reinforce walls having multiple vertical layers, tie rods or reinforced holes extending between and interconnecting the layers may provide the extra support and rigidity needed for the wall, without adversely impacting its appearance.

Figure 8:
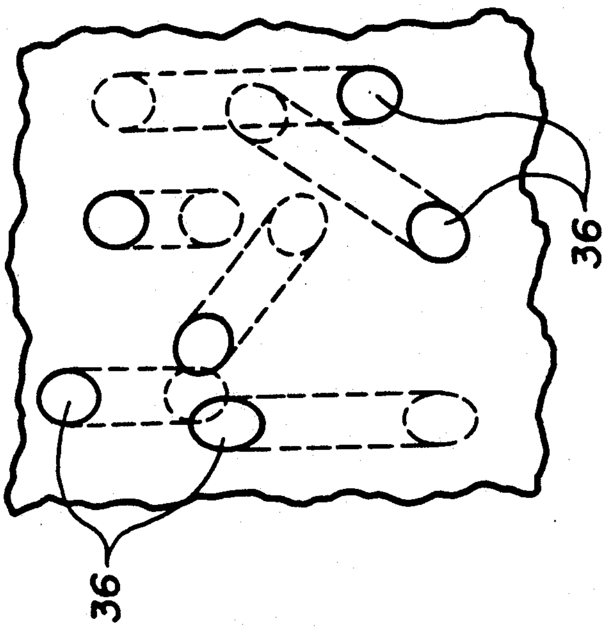
FIG. 8 is a front elevation showing a predetermined pattern of holes adapted to be filled with sealing material to reinforce a building structure.

For this purpose, a plurality of holes 36 can be drilled into and/or through the wall layers in a predetermined pattern selected according to the construction and materials involved and the condition of those materials. The holes can be staggered, can spacially cross one another, can be arranged in geometric patterns or can be intermittently spaced relative to one another, as required. FIGS. 7 and 8 schematically illustrate and exemplify different patterns and spacial possibilities which schematically show potential crossing, vertical staggering and angular orientations.

As best illustrated in FIG. 9, to fill the holes, the auger extension 24 is normally selected to be approximately the length of the hole being filled or plural auger extensions may be used. The auger extension is inserted into the hole, and the operator then actuates trigger 3 to begin operation of the applicator gun. Sealing material is conveyed lengthwise along the auger 7 and auger extension 24 into the hole 36. Preferably, the front end or nose of the nozzle 16 is positioned against the vertical outer surface of the wall to contain the sealing material being conveyed along the auger and auger extension within the hole 36. The auger extension provides a means for positively conveying sealing material along the auger flights 8 and 26 into the hole 36. By this positive feed, the sealing material 37 fills and is properly compacted within the hole 36 to provide rigidity in the reinforcement. When the hole is entirely filled with sealing material, the auger extension is uncoupled and remains within the hole as a central anchor or reinforcement as shown in FIG. 9.

Some of the older buildings also have walls with irregular voids formed therein by moisture, by material degradation and/or by material or building shifts. These voids often have irregular configurations. To fill these voids, the shaft 25 of auger extension 24 is preferably flexible to allow the auger extension to be physically received in an irregularly shaped or formed void. Once received, the auger extension is used to fill the void and remains in the filled void in the same manner as described above.

Figure 10:
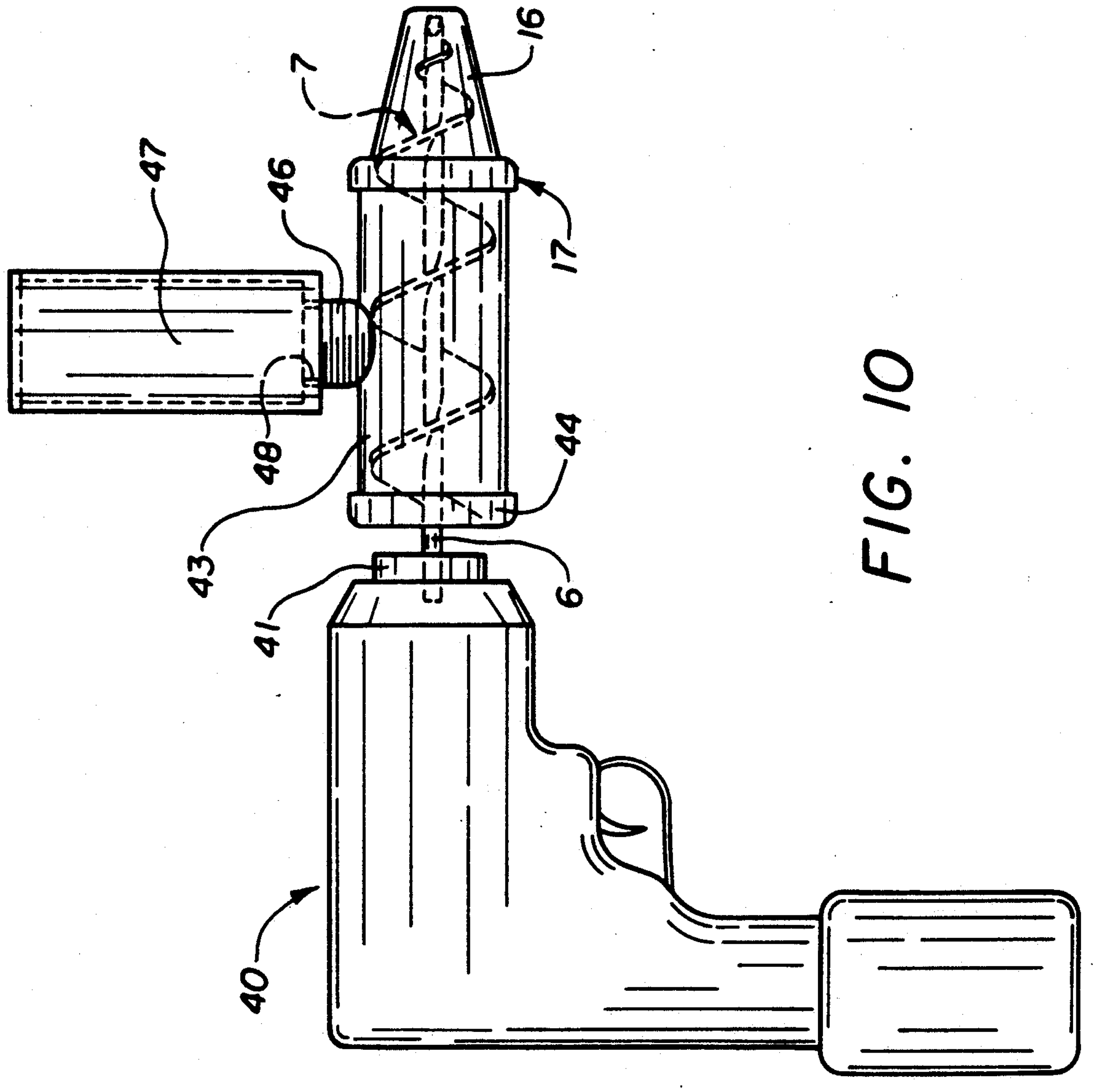
FIG. 10 is a side elevation of another embodiment of the present invention in which the sealing material container, auger housing, auger and nozzle are provided as an add-on unit to a handheld power tool.

Turning now to FIG. 10, another embodiment of the invention is illustrated wherein the applicator apparatus is an add-on unit to a conventional pistol grip power tool, indicated generally at 40. The power tool 40 includes a keyed chuck 41 which selectively receives and tightly grips the back end of auger shaft 6 for auger 7. Auger 7 is received in a modified auger housing 43. The auger housing 43 has threaded forward and rear ends, with the rear end thereof threadedly receiving a back cover plate 44. The cover plate 44 has a hole therein which either has a diameter substantially the same as the diameter of the rear end of auger shaft 6 or has its wall sealed to the rotatable auger shaft 6.

The top of auger housing 43 may be provided with an upwardly projecting externally threaded nipple 46. A container 47 has an internally threaded neck 48 thereon which threadedly mates with nipple 46 on auger housing 43. The threaded connection between auger housing nipple 46 and container neck 48 provides a tight sealed connection therebetween. Container 47 may have any desired volume and can be used with caulks. The upper end of container 47 can be provided with an aperture to admit a plastic mixer for the caulking material or a plunger for vertical movement to force the caulk into the auger housing 43 for conveyance along auger 7.

The add-on applicator unit may be swivelled relative to gun to provide the operator some flexibility in movements during the application process. On the other hand, the add-on unit may not be balanced quite as well as the stand alone unit.

An operator may expend a substantial period of time at the conclusion of the day cleaning the tools used. To avoid the time expended in this cleaning or maintenance function, the container 47, auger housing 43 and auger 7 may be made of disposable materials to be discarded at the conclusion of each day. By making these components of relatively inexpensive disposable materials, the time spent in applying sealing material is maximized to improve cost effectiveness on the job.

Figures 11, 12:
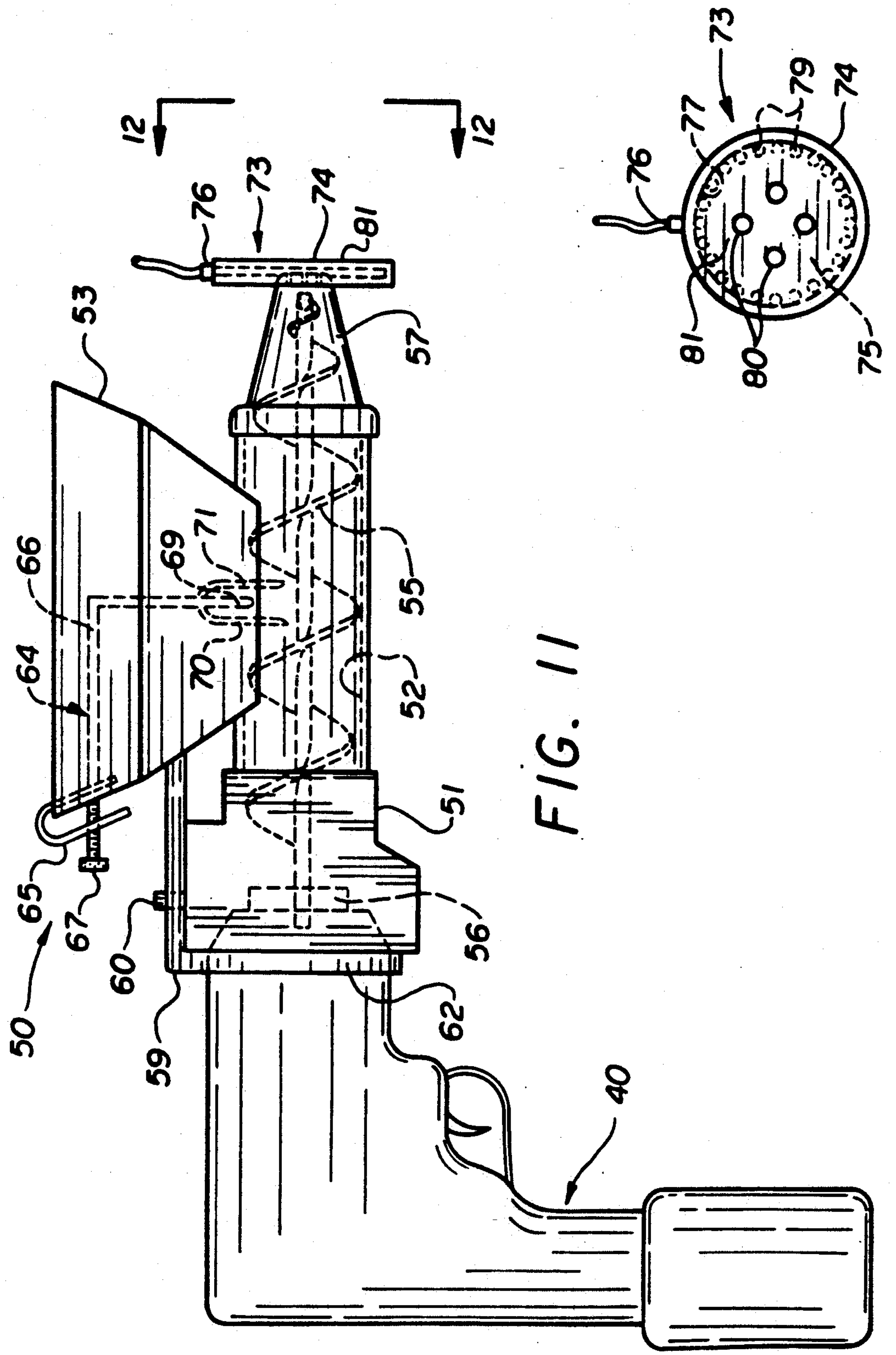
FIG. 11 is a side elevation of another embodiment in which an add-on unit is held fixed relative to the power tool, an air manifold on the nozzle is used to spray the sealing material and a scraper is used to assist in feeding the sealing material from the hopper.
FIG. 12 is an end view of the air manifold taken generally along the plane 12—12 of FIG. 11.

Turning now to FIGS. 11 and 12, yet another embodiment is illustrated wherein like parts to previous embodiments bear the same reference numerals. In this embodiment, the applicator apparatus, indicated generally at 50, is also an add-on unit to the conventional pistol grip power tool, indicated generally at 40. The applicator apparatus includes a main auger housing 51, having a bore 52 therethrough, and a hopper 53. An auger 55 is removably mounted to the chuck 56 of power tool 50. The auger extends through bore 52 of housing 51 into the nozzle 57 thereof.

In this embodiment, the applicator apparatus 50 is held fixed relative to the power tool 40. For this purpose, the hopper 53 has a connector strap 59 rigidly mounted thereon and extending rearwardly therefrom. The connector strap has a slot therein, which tightly receives an upwardly extending stud 60 on housing 51. The back end of connector strap 59 has an arcuate collar 62 which encircles the body of and is connected to power tool 40 to provide the rigid mount to the tool.

The sealant material is placed in hopper 53 for gravity feed to auger 55 as needed. Occasionally, depending upon its consistency, the sealant material may not feed downwardly as well as desired. In these instances, a scraper, indicated generally at 64 may be added to the hopper 53 to assist in mixing and feeding the sealant material.

The scraper 64 includes a U-shape mounting bracket 65 and a reinforced L-shape arm 66 connected to the bracket. The U-shape bracket is positioned over the wall of the hopper and is secured thereto by at least one thumb screw 67. As thus mounted, the reinforced L-shape arm 66 is positioned inside the hopper 53. The end of arm 66 may be provided with any suitable mixing and/or scraping mechanism. As shown, the arm 66 terminates in three tines. The middle tine 69 extends downwardly to a terminus adjacent the auger shaft. The tines 70 and 71 on either side of middle tine 69 respectively extend slightly rearwardly and forwardly and terminate adjacent the auger flight in axially spaced locations.

In operation, the scraper 64 has some flexibility due to its mount and materials of construction to allow some oscillation thereof within the sealing material for mixing and feeding purposes. In addition, the tines 69-71 scrape and mix sealing material along the auger flight to assist in the mixing and feeding process.

It will be appreciated that the scraper may take other forms than that show. For example, the scraper could be permanently mounted on the hopper with a spatula type end to mix and scrape the sealant material. The scraper 64, when used with any of the embodiments shown, improves feed of the sealing material to the auger for feed through the nozzle.

On occasion, the sealing material being fed through the nozzle may be fluidized for a spray application. Spraying may be used, for example, when sealing material is being applied for a stucco type look.

For this purpose, an air manifold, indicated generally at 73, may be added to or provided as a part of the applicator apparatus 50 The air manifold includes a generally cylindrical housing 74 having an annular air compartment 75 and a pressurized air inlet 76. The radially inner wall 77 of annular air compartment 75 has a plurality of circumferentially spaced air holes 79. The number and pattern of these air holes may be selected to create the desired air flow pattern within the nozzle to fluidize the sealant material. As will be appreciated, pressurized air enters annular compartment 75 by way of inlet 76 and then passes through circumferentially spaced holes 79 to fluidize the sealant material in the nozzle. The fluidized sealant material is sprayed through outlet holes 80 in the end wall 81 of air manifold 73. The number, size and pattern of outlet holes 80 are selected to provide the spray pattern desired.

Figure 13:
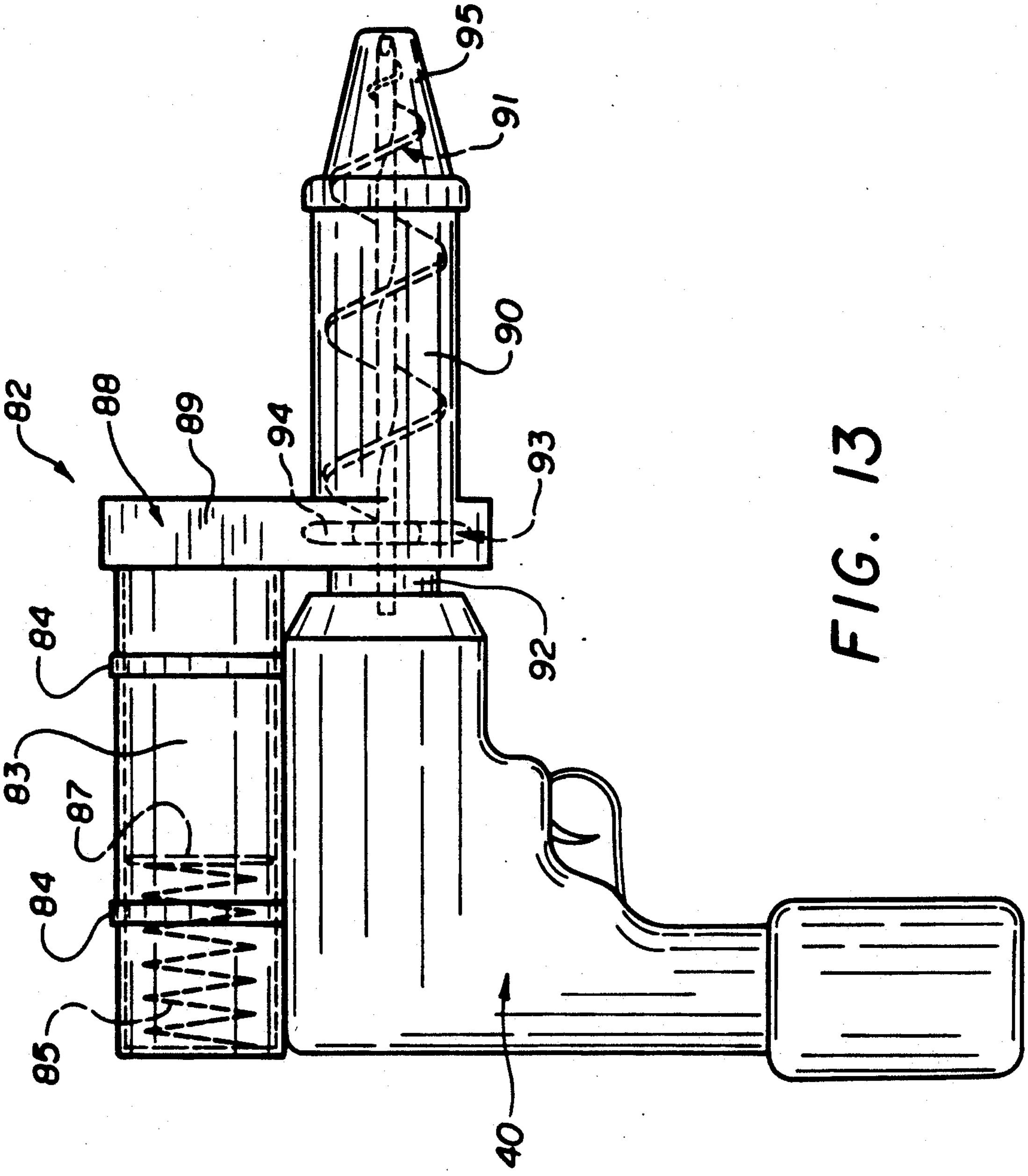
FIG. 13 is a side elevation of an applicator gun specially adapted for applying caulk.

Turning now to the embodiment shown in FIG. 13, the pistol grip power tool 40 has a special applicator apparatus, indicated generally at 82, mounted thereon. The applicator apparatus 82 includes a disposable tube 83 initially filled with caulk. The tube 83 is removably, rigidly mounted on power tool 40 by axially spaced mounting straps 84 or any other similar mount. The tube 83 has a coil spring 85 positioned between its back end wall and a relatively movable pusher plate 87. The spring normally urges the pusher plate to the right as viewed in FIG. 13 to force caulk into the housing indicated generally at 88. The spring may also be replaced by a pressurized pneumatic system.

The housing 88 includes a feed neck 89, removably coupled to tube 83, and a hollow body 90, surrounding the auger 91. The auger is removably connected to the keyed chuck 92 of power tool 40. The auger is formed with an impeller, indicated generally at 93, extending radially outwardly therefrom. The impeller may have a plurality of circumferentially spaced vanes or blades 94 formed thereon. The vanes 94 extend generally radially from the auger shaft and have a length greater than the radius of the auger flight. Impeller 93 rotates when auger 91 is selectively rotated. With such rotation, the vanes or blades 94 act to assist in urging the caulk downwardly through feed neck 89 to the flight of auger 91. The caulk is then progressively conveyed along auger 91 through nozzle 95 onto the surface being caulked.

It will be apparent from the foregoing that changes may be made in the details of construction and configuration without departing from the spirit of the invention as defined in the following claims. For example, the scraper 64 in FIG. 11 could be replaced by an impeller 93 as shown in FIG. 13.

What is claimed:

1. A method of applying sealing material to, into, onto or between building components or materials comprising the steps of:

temporarily holding a supply of sealing material in a container;

providing an auger positioned beneath a bottom opening in the container, an auger housing in which the auger is substantially enclosed along at least part of its length, and a nozzle coupled to the outlet end of the auger housing in which the auger is enclosed along a portion of its length;

temporarily rotatably securing an auger extension to the end of the auger, the auger extension and the end of the auger being connected outside of the nozzle and the auger extension extending beyond the nozzle to allow the auger extension to be inserted into a hole in building components or materials and disconnected from the end of the auger;

positioning the auger extension in the hole in building components or materials; and conveying the sealing material from a bottom opening in the container along the auger and the auger extension into the hole to fill the hole.

2. The method of claim 1 comprising the further steps of periodically replacing the auger and container.

3. The method of claim 1 comprising the further step of mixing the sealant material in the container.

4. The method of claim 3 comprising the further step of mixing the sealant material in the auger housing.

5. A method of applying sealing material to, into, onto or between building components or materials comprising the steps of:

temporarily holding a supply of sealing material in a container;

providing an auger positioned beneath a bottom opening in the container, an auger housing in which the auger is substantially enclosed along at least part of its length, and a nozzle coupled to the outlet end of the auger housing;

temporarily rotatably securing an auger extension to the end of the auger, the auger extension extending beyond the nozzle whereby the extension is exposed;

positioning the auger extension in a hole in building components or materials;

conveying the sealing material from a bottom opening in the container along the auger and the auger extension into the hole to fill the hole;

disconnecting the auger extension; and leaving the auger extension in the hole within the sealing material as a central anchor.

6. The method of claim 5 comprising the further steps of:

drilling a plurality of holes in a predetermined pattern relative to one another, and thereafter filling each of those holes with sealing material and a central anchor.

7. An apparatus to apply sealing material comprising:

a power tool;

a container carried by said power tool temporarily holding a supply of sealing material;

an auger positioned beneath a bottom opening in said container and selectively rotated by said power tool to convey sealing material received from the container along the auger to, into, onto or between building components or materials;

an auger housing in which said auger is substantially enclosed along at least part of its length in order to contain the sealing material during conveyance along said auger;

a nozzle coupled to the outlet end of said auger housing in which said auger is enclosed along a portion of its length, said nozzle being operative to direct the sealing material from the end of said auger to a point of application; and an auger extension which is releasably coupled to the end of said auger, wherein said auger extension and the end of said auger are coupled outside of said nozzle and said auger extension extends beyond said nozzle to allow said auger extension to be inserted into a hole in building components or materials and uncoupled from the end of said auger.

8. The apparatus of claim 7 wherein the container is a hopper and the auger is at least partially received within the power tool.

9. The apparatus of claim 7 wherein the container is mounted on said auger housing and the auger is coupled to a rotary drive output on the power tool.

10. The apparatus of claim 7 wherein the auger extension is adapted to form a central reinforcement member in the hole in building components or materials after said auger extension is inserted into the hole, the hole is filled with sealing material, and said auger extension is uncoupled from the end of said auger and remains within the sealing material in the hole.

11. The apparatus of claim 7 wherein the auger is made from plastic and can be periodically replaced by another plastic auger.

12. The apparatus of claim 11 or 7 wherein the container is removable from said auger housing and can be replaced by another container.

13. The apparatus of claim 7 wherein the container, auger housing and auger are removably added onto a handheld power tool.

14. The apparatus of claim 13 wherein the container is a hopper and a scraper is removably positioned in the hopper to assist in mixing and feeding the sealant material.

15. The apparatus of claim 13 wherein the auger has an impeller thereon to rotatably urge the sealant material from the container to the auger, said impeller including a plurality of circumferentially spaced, generally radially extending vanes having respective lengths greater than the radius of the auger flight.

16. The apparatus of claim 7 wherein the auger housing further comprises an air manifold which fluidizes the sealant material for spraying.

* * * * *